(12) United States Patent
Yao

(10) Patent No.: US 11,682,964 B2
(45) Date of Patent: Jun. 20, 2023

(54) DRIVING CIRCUIT AND DRIVING METHOD

(71) Applicant: SILERGY SEMICONDUCTOR TECHNOLOGY (HANGZHOU) LTD, Zhejiang (CN)

(72) Inventor: Kaiwei Yao, Zhejiang (CN)

(73) Assignee: SILERGY SEMICONDUCTOR TECHNOLOGY (HANGZHOU) LTD, Zhejiang (CN)

( * ) Notice: Subject to any disclaimer, the term of this patent is extended or adjusted under 35 U.S.C. 154(b) by 113 days.

(21) Appl. No.: 17/400,818

(22) Filed: Aug. 12, 2021

(65) Prior Publication Data
US 2022/0052597 A1 Feb. 17, 2022

(30) Foreign Application Priority Data

Aug. 13, 2020 (CN) .......................... 202010813834.X

(51) Int. Cl.
*H02M 1/08* (2006.01)
*H02M 1/088* (2006.01)
*H02M 3/158* (2006.01)

(52) U.S. Cl.
CPC .......... *H02M 1/088* (2013.01); *H02M 3/158* (2013.01)

(58) Field of Classification Search
CPC .... H02M 1/088; H02M 3/158; H02M 3/1566; H02M 3/1582
See application file for complete search history.

(56) References Cited

U.S. PATENT DOCUMENTS

| 9,931,951 B2* | 4/2018 | Khaligh | .............. B60L 55/00 |
| 2010/0067259 A1 | 3/2010 | Liu | |
| 2015/0097507 A1* | 4/2015 | Kim | .............. H02M 3/1582 318/504 |

FOREIGN PATENT DOCUMENTS

| CN | 102437728 A | 5/2012 |
| CN | 103346684 A | 10/2013 |
| CN | 104184149 A | 12/2014 |
| CN | 110445363 A | 11/2019 |
| CN | 110571906 A | 12/2019 |

OTHER PUBLICATIONS

CNIPA First Office Action for corresponding CN Application No. 2020010813834.X; dated Jun. 2, 2021.

* cited by examiner

*Primary Examiner* — Adolf D Berhane
*Assistant Examiner* — Afework S Demisse
(74) *Attorney, Agent, or Firm* — Cantor Colburn LLP

(57) ABSTRACT

A driving circuit and a driving method are provided. The driving circuit includes an energy-storage capacitor, a first power converter and a bidirectional converter. An output port of the first power converter is coupled to a load and the energy-storage capacitor. The energy-storage capacitor is connected in parallel with the load. The bidirectional converter is coupled between the load and the energy-storage capacitor. The first power converter supplies power to the load during a light load interval. During at least a part of the light load interval, the first power converter charges the energy-storage capacitor via the bidirectional converter. During a heavy load interval, the first power converter supplies power to the load and the energy-storage capacitor supplies power to the load via the bidirectional converter. The driving circuit is applicable to drive a load requiring low average power and high peak power.

23 Claims, 9 Drawing Sheets

DRIVING CIRCUIT AND DRIVING METHOD

CROSS REFERENCE TO RELATED APPLICATIONS

The present invention claims priority under 35 U.S.C. § 119 to Chinese Patent Application No. 202010813834.X, filed on Aug. 13, 2020, the entire content of which is incorporated herein by reference.

FIELD

The present disclosure relates to the field of power electronics, and in particular to a driving circuit and a driving method.

BACKGROUND

With increasingly variety of types, uses and application scenarios of loads, a higher demand is required for a circuit for driving a load. In the conventional technology, a circuit for driving a load is a power converter. As shown in FIG. 1, a load 2 is directly driven by a first power converter 1. The first power converter 1 has maximum output power. FIG. 2 shows an output characteristic curve of the first power converter in FIG. 1. As shown in FIG. 2, in a case that the load is too heavy, an output voltage Vout of the first power converter 1 is lower than a threshold voltage $V_{UVLO}$, to trigger a protection mechanism, so that the first power converter 1 is shut down or restarted.

However, in some application scenarios, during operation of the load 2, there is a time interval during which power required by the load is greater than the maximum output power of the first power converter 1. That is, average power required by the load 2 is lower than the maximum output power of the first power converter 1, and peak power required by the load 2 is higher than the maximum output power of the first power converter 1. As shown in FIG. 3, average power P_Load_avg required by the load 2 is lower than maximum output power Po_max of the first power converter 1. The maximum output power Po_max is equal to a product of maximum output voltage Vo_max and maximum output current Io_max. During most of a light load interval (such as a time interval from a time instant t0 to a time instant t1 and a time interval from a time instant t2 to a time instant t3), the power required by the load 2 is very low. In such case, the first power converter 1 is capable of supplying the power required by the load 2. However, during a heavy load interval (such as a time interval from a time instant t1 to a time instant t2), power P_Load_max required by the load 2 is greater than the maximum output power Po_max of the first power converter 1, so that the output voltage Vout of the first power converter 1 is lower than the threshold voltage $V_{UVLO}$ to trigger the protection mechanism. In such case, the first power converter 1 cannot provide the power required by the load 2. Therefore, the conventional driving circuit cannot drive a load requiring low average power and high peak power.

SUMMARY

In view of this, a driving circuit and a driving method are provided according to the present disclosure, to solve a technical problem that the conventional driving circuit cannot drive the load requiring low average power and high peak power.

According to a first aspect, a driving circuit is provided according to an embodiment of the present disclosure. The driving circuit includes an energy-storage capacitor, a first power converter and a bidirectional converter. An output port of the first power converter is coupled to the load and the energy-storage capacitor. The first power converter is configured to generate a direct current signal to supply power to the load during a light load interval and a heavy load interval. The bidirectional converter is coupled between the load and the energy-storage capacitor. The first power converter is further configured to charge the energy-storage capacitor via the bidirectional converter during at least part of the light load interval. The energy-storage capacitor is configured to supply power to the load via the bidirectional converter during the heavy load interval.

In an embodiment, when a voltage at a first port of the bidirectional converter is less than a first reference voltage, the light load interval is switched to the heavy load interval. The first port of the bidirectional converter is coupled to the load.

In an embodiment, the first power converter is configured to charge the energy-storage capacitor via the bidirectional converter during a part of the light load interval. During other part of the light load interval, the bidirectional converter does not operate, and the first power converter does not charge the energy-storage capacitor.

In an embodiment, the first power converter is configured to charge the energy-storage capacitor via the bidirectional converter during the light load interval.

In an embodiment, an operation state of the bidirectional converter is controlled, to control: the bidirectional converter to operate in a forward direction during the at least a part of the light load interval; and the bidirectional converter to operate in a reverse direction during the heavy load interval.

In an embodiment, the energy-storage capacitor is charged and supplies power to the load via the bidirectional converter, so as to control a voltage of the energy-storage capacitor to vary in a wide range, thereby reducing capacity of the energy-storage capacitor.

In an embodiment, whether to charge the energy-storage capacitor or whether to control the energy-storage capacitor to supply power to the load is determined based on a voltage of at first port of the bidirectional converter and a voltage of the energy-storage capacitor.

In an embodiment, when the voltage at the first port of the bidirectional converter is less than a first reference voltage, the bidirectional converter is enabled, and the energy-storage capacitor is charged or supplies power to the load.

In an embodiment, when the voltage of the energy-storage capacitor is greater than a second reference voltage, the bidirectional converter stops operating, and the energy-storage capacitor stops being charged or supplying power to the load.

In an embodiment, the bidirectional converter includes an inductor. In a case that the bidirectional converter is enabled, a magnitude and a direction of an inductor current are controlled based on an inductor current reference signal, to control a voltage at a first port of the bidirectional converter to be equal to a third reference voltage. The inductor current reference signal is adjusted based on the voltage at the first port of the bidirectional converter.

In an embodiment, when the voltage at the first port of the bidirectional converter is greater than the third reference voltage, the inductor current reference signal is controlled to increase, thereby increasing power transmitted from the first port of the bidirectional converter to the energy-storage capacitor. When the voltage at the first port of the bidirectional converter is less than the third reference voltage, the inductor current reference signal is controlled to decrease, thereby decreasing power transmitted from the first port of the bidirectional converter to the energy-storage capacitor, or controlling power to be transmitted from the energy-storage capacitor to the first port of the bidirectional converter.

In an embodiment, during the light load interval, output power of the first power converter is equal to a sum of power required by the load and input power to a first port of the bidirectional converter. During the heavy load interval, the power required by the load is equal to a sum of output power of the first power converter and output power from the first port of the bidirectional converter.

In an embodiment, the bidirectional converter is a bidirectional direct current to direct current (DC-DC) converter.

In an embodiment, during the light load interval, an output current of the first power converter is equal to a sum of a current flowing through the load and an input current at a first port of the bidirectional converter. During the heavy load interval, a current flowing through the load is equal to a sum of an output current of the first power converter and an output current at the first port of the bidirectional converter.

In an embodiment, the driving circuit further includes a control circuit. The control circuit includes an enabling circuit. The enabling circuit is configured to receive a first sampling signal characterizing a voltage at a first port of the bidirectional converter, a second sampling signal characterizing a voltage of the energy-storage capacitor, a first reference voltage signal and a second reference voltage signal, and output a first enabling signal. When the first sampling signal is less than the first reference voltage signal, the first enabling signal is valid and the bidirectional converter is enabled. When the second sampling signal is greater than the second reference voltage signal, the first enabling signal is invalid and the bidirectional converter is disabled.

In an embodiment, the bidirectional converter includes an inductor. The control circuit further includes a reference signal adjusting circuit, an inductor current sampling circuit and a controlling module.

The reference signal adjusting circuit is configured to receive the first sampling signal and a third reference voltage signal, and adjust an inductor current reference signal and output the adjusted inductor current reference signal.

The inductor current sampling circuit is configured to sample a first current characterizing an inductor current, and add a direct current bias to the first current to output a second current. The second current is positive.

The control module is configured to receive the inductor current reference signal, the second current and the first enabling signal, and output a control signal to control an operation state of the bidirectional converter, so as to control a magnitude and a direction of the inductor current.

When the first sampling signal is greater than the third reference voltage signal, the inductor current reference signal is controlled to increase, thereby increasing power transmitted from the first port of the bidirectional converter to the energy-storage capacitor. When the first sampling signal is less than the third reference voltage signal, the inductor current reference signal is controlled to decrease, thereby decreasing power transmitted from the first port of the bidirectional converter to the energy-storage capacitor, or controlling power to be transmitted from the energy-storage capacitor to the first port of the bidirectional converter.

In an embodiment, the bidirectional converter operates in a forward direction, the bidirectional converter operates in a buck state. In a case that the bidirectional converter operates in a reverse direction, the bidirectional converter operates in a boost state.

In an embodiment, the bidirectional converter is a bidirectional boost converter. In a case that the bidirectional converter operates in a forward direction, the bidirectional converter operates in a boost state. In a case that the bidirectional converter operates in a reverse direction, the bidirectional converter operates in a buck state.

In an embodiment, the bidirectional converter is a bidirectional buck-boost converter, in a case that the bidirectional converter operates in a forward direction, the bidirectional converter operates in a buck state and a boost state sequentially. In a case that the bidirectional converter operates in a reverse direction, the bidirectional converter operates in a buck state and a boost state sequentially.

In an embodiment, the bidirectional converter includes a current limiting circuit. The current limiting circuit is configured to limit a maximum input current or a maximum output current when the bidirectional converter operates in a forward direction.

In an embodiment, the bidirectional converter is the bidirectional boost converter, and the current limiting circuit is coupled between a first port of the bidirectional converter and the load, to limit the maximum input current.

In an embodiment, the bidirectional converter is the bidirectional boost converter, and the bidirectional converter includes a power switch. The power switch is coupled to the energy-storage capacitor, and the current limiting circuit is coupled to the power switch, to limit the maximum output current.

In an embodiment, the bidirectional converter is the bidirectional buck-boost converter, and the buck-boost converter includes a power switch. The power switch is coupled to the load. The power switch is configured to serve as the current limiting circuit when the bidirectional converter operates in the boost state in a forward direction.

In an embodiment, the current limiting circuit is formed by a switch transistor. The switch transistor is configured to operate in a linear state. Resistance of the switch transistor is controlled by controlling a voltage of a control terminal of the switch transistor to control the maximum output current or the maximum input current.

In an embodiment, the bidirectional converter is the bidirectional buck-boost converter. The buck-boost converter includes an inductor, a first power switch and a second power switch. The first power switch is coupled to the load. The second power switch is coupled to the first power switch. The inductor is coupled to both the first power switch and the second power switch. The first power switch is configured to operate in a pulse width modulation (PW) state. The second power switch is configured to serve as a diode. The inductor, the first power switch and the second power switch form a buck circuit, to serve as the current limiting circuit.

In an embodiment, the first power converter is a DC-DC converter, or an alternating current to direct current (AC-DC) converter.

According to a second aspect, a driving method is further provided according to an embodiment of the present disclosure. The driving method is applied to a driving circuit. The driving circuit includes a bidirectional converter, a first power converter and an energy-storage capacitor. An output port of the first power converter is coupled to a load and the energy-storage capacitor. The energy-storage capacitor is connected in parallel with the load. The bidirectional converter is coupled between the load and the energy-storage capacitor. The driving method includes:

supplying, by the first power converter, power to the load during a light load interval and a heavy load interval;

charging, by the first power converter, the energy-storage capacitor via the bidirectional converter during at least a part of the light load interval; and supplying, by the energy-storage capacitor, power to the load via the bidirectional converter during the heavy load interval.

Compared with the conventional technology, the technical solutions according to the present disclosure have the following advantages. The driving circuit according to the present disclosure includes an energy-storage capacitor, a first power converter and a bidirectional converter. The energy-storage capacitor is connected in parallel with a load. An output port of the first power converter is coupled to the load and the energy-storage capacitor. The bidirectional converter is coupled between the load and the energy-storage capacitor. During a light load interval, the first power converter provides power to the load. During at least a part of the light load interval, the first power converter provides power to the energy-storage capacitor through the bidirectional converter. During a heavy load interval, the first power converter supplies power to the load and the energy-storage capacitor supplies power to the load via the bidirectional converter. The driving circuit according to the present disclosure is applicable to drive a load requiring low average power and high peak power. In addition, the energy-storage capacitor is charged and supplies power to the load via the bidirectional converter, so that the voltage of the energy-storage capacitor varies in a wide range, thereby reducing a capacity of the energy-storage capacitor. That is, the driving circuit according to the present disclosure includes an energy-storage capacitor with a small capacity, so that a volume of the energy-storage capacitor is reduced, thereby reducing a volume and cost of the driving circuit, and reducing a maximum power demand of the first power converter.

BRIEF DESCRIPTION OF THE DRAWINGS

The above and other objects, features and advantages of the present disclosure will become clearer by describing the embodiments of the present disclosure below with reference to the drawings. In the drawings.

DETAILED DESCRIPTION OF EMBODIMENTS

The present disclosure is described below based on embodiments. However, the present disclosure is not limited to these embodiments. In the description of details of the present disclosure hereinafter, some specific details are described. Those skilled in the art can completely understand the present disclosure without the description of the details. In order to avoid obscuring the substance of the present disclosure, well-known methods, procedures, processes, elements and circuits are not described in detail.

In addition, those skilled in the art should understand that the drawings are provided herein for illustration, and are unnecessarily drawn to scale.

In addition, it should be understood that in the following description, the term "circuit" indicates a conductive loop formed by at least one element or sub-circuit through electrical connection or electromagnetic connection. When an element or circuit is described as "connected to" another element or when an element or circuit is described as "connected" between two nodes, the element or circuit may be directly coupled or connected to another element, or there is other element between the element or circuit and another element. The connection between elements may be physical, logical, or a combination thereof. In addition, when an element is described as "directly coupled" or "directly connected" to another element, there is no element between the element and another element.

Figure 4:
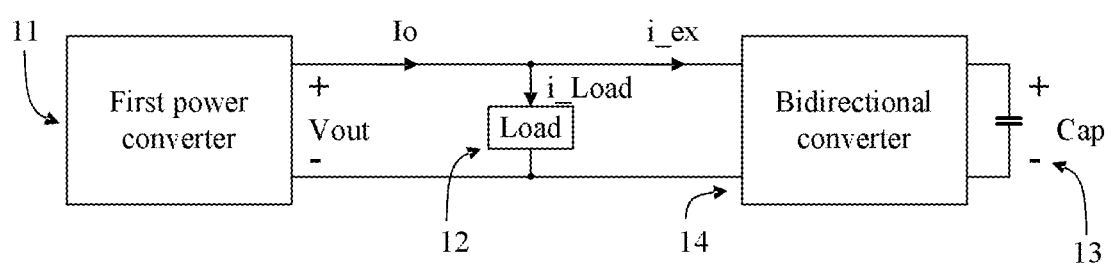
FIG. 4 is a block diagram of a driving circuit according to the present disclosure.

FIG. 4 is a block diagram of a driving circuit according to the present disclosure. The driving circuit is configured to drive a load requiring low average power and high peak power. The driving circuit includes a first power converter 11, an energy-storage capacitor (Cap) 13 and a bidirectional converter 14. An output port of the first power converter 11 is coupled to a load 12 and the energy-storage capacitor 13. The energy-storage capacitor 13 is connected in parallel with the load 12. The bidirectional converter 14 is coupled between the load 12 and the energy-storage capacitor 13. The first power converter 11 is configured to generate a direct current (DC) signal, so as to supply power to the load 12 during both light load and heavy load intervals. In addition, during at least a part of the light load interval, the first power converter 11 charges the energy-storage capacitor 13 via the bidirectional converter 14. During the heavy load interval, the energy-storage capacitor 13 supplies power to the load 12 via the bidirectional converter 14.

Figure 1:
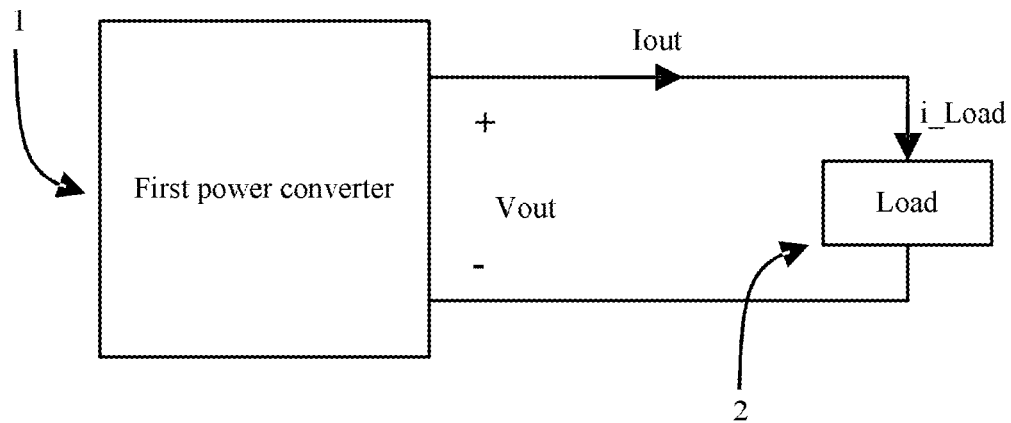
FIG. 1 is a schematic diagram showing a driving circuit according to the conventional technology.
Figure 2:
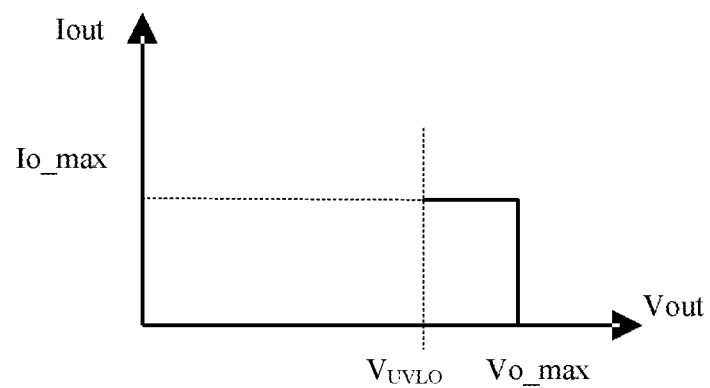
FIG. 2 shows an output characteristic curve of a first power converter according to the conventional technology.
Figure 3:
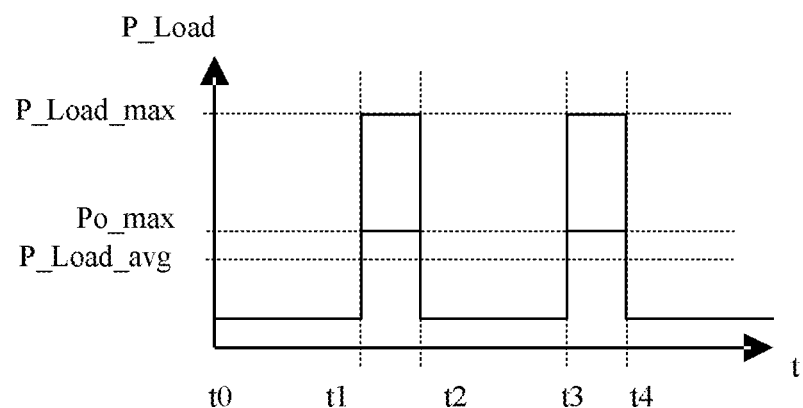
FIG. 3 is a schematic diagram showing an operation waveform of a load according to the present disclosure.

In application scenarios of a load driven by the driving circuit according to the present disclosure, during operation of the load 12, there is one or more time intervals during which power required by the load 12 is greater than maximum output power of the first power converter 11. During the operation of the load, a time interval during which the power required by the load 12 is greater than the maximum output power of the first power converter 11 is the heavy load interval, and a time interval during which the power required by the load 12 is less than or equal to the maximum output power of the first power converter 11 is the light load interval. In an embodiment, the load is an active load. In an embodiment, the load is a power amplifier, which operates in a scenario where outputted sound power is required to be amplified. Thus, an operation waveform of the power amplifier involves a time interval during which the power required by the load 12 is greater than the maximum output power of the first power converter 11. Furthermore, the load is a class D amplifier. It should be noted that FIG. 3 shows only an illustrative operation waveform of the load according to the present disclosure. The operation waveform of the load in FIG. 3 is periodic and a period is fixed. However, in other embodiments, the operation waveform of the load is aperiodic or the period is not fixed. The operation waveform of the load is not limited in the present disclosure, and any case that the operation duration of the load includes a heavy load interval falls within the protection scope of the present disclosure. Moreover, during different heavy load intervals in FIG. 3 (for example, a time interval from a time instant t1 to a time instant t2, and a time interval from a time instant t3 to a time instant t4), the peak power required by the load (that is, power required by the load during the heavy load interval) is the same. However, in other embodiments, the peak power required the load varies during different heavy load intervals, which is not limited in the present disclosure. For convenience of the following description, description is made based on the operation waveform of the load shown in FIG. 3. However, the operation waveform of the load is not limited in the present disclosure.

The first power converter 11, configured to generate a direct current signal, can be a direct current to direct current (DC-DC) power converter or an alternating current to direct current (AC-DC) power converter. In an embodiment, the first power converter is a power supply converter or a power adapter. The bidirectional converter is a bidirectional DC-DC converter, such as a bidirectional buck converter, a bidirectional boost converter, a bidirectional buck-boost converter, and a bidirectional boost-buck converter.

In an embodiment, during a part of the light load interval, the first power converter 11 charges the energy-storage capacitor 13 via the bidirectional converter 14. During other part of the light load interval, the bidirectional converter 14 does not operate, and the first power converter 11 does not charges the energy-storage capacitor 13. For example, a voltage of the energy-storage capacitor 13 is controlled, so that the first power converter 11 stops charging the energy-storage capacitor 13 when the voltage of the energy-storage capacitor 13 is greater than a preset reference voltage.

In an embodiment, during the whole light load interval, the first power converter 11 charges the energy-storage capacitor 13 via the bidirectional converter 14. For example, the charging or the voltage of the energy-storage capacitor 13 is not controlled. Alternatively, the voltage of the energy-storage capacitor 13 is controlled, but the light load interval is short, such that the voltage of the energy-storage capacitor 13 is still less than or equal to the preset reference voltage until the end of the light load interval.

Further, an operation state of the bidirectional converter 14 is controlled, so that the bidirectional converter 14 operates in a forward direction during at least a part of the light load interval, to charge the energy-storage capacitor 13. During the heavy load interval, the bidirectional converter 14 operates in a reverse direction, so that the energy-storage capacitor 13 supplies power to the load.

The driving circuit according to the present disclosure is configured to drive a load requiring low average power and high peak power. During the light load interval, the first power converter supplies power to the load, and during at least a part of the light load interval, the first power converter charges the energy-storage capacitor via the bidirectional converter. During the heavy load interval, the first power converter supplies power to the load, and the energy-storage capacitor supplies power to the load via the bidirectional converter. The energy-storage capacitor is charged and supplies power to the load via the bidirectional converter, so that the voltage of the energy-storage capacitor varies in a wide range, thereby reducing the capacity of the energy-storage capacitor. That is, an energy-storage capacitor with small capacity is arranged, so that a volume of the energy-storage capacitor is reduced, thereby reducing volume of the driving circuit, minimizing cost and size of the system, reducing a maximum power demand of the first power converter. That is, maximum output power of the first power converter is low. Specifically, power Energy_Ccap stored in the energy-storage capacitor 13 is expressed by the following equation:

$$\text{Energy\_Ccap} = \frac{1}{2} * C * (Vcp^2 - Vcv^2),$$

where C represents the capacity of the energy-storage capacitor 13, Vcp represents a voltage of the energy-storage capacitor 13 when the charging of the energy-storage capacitor 13 is completed, and Vcv represents a voltage of the energy-storage capacitor 13 when the charging of energy-storage capacitor 13 starts. During the light load interval, the power Energy_Ccap stored in the energy-storage capacitor 13 is greater than a difference between the power required by the load 12 and the power provided by the first power converter 11 during the heavy load interval. If the driving circuit has no bidirectional converter 14, the voltage of the energy-storage capacitor 13 is equal to an output voltage of the first power converter 11. Since the output voltage of the first power converter 11 varies in a small range, the voltage of the energy-storage capacitor 13 varies in a small range from Vcv to Vcp. That is, a difference between Vcp and Vcv is small, and thus $Vcp^2 - Vcv^2$ is small. Therefore, when storing the same power, the energy-storage capacitor 13 is required to have a greater capacity C in the driving circuit without the bidirectional converter 14. In the driving circuit according to the present disclosure, the bidirectional converter 14 is coupled between the load 12 and the energy-storage capacitor 13. The energy-storage capacitor 13 is charged and supplies power to the load via the bidirectional converter 14. The voltage of the energy-storage capacitor 13 is independent of the voltage outputted by the first power converter 11, so that the voltage of the energy-storage capacitor 13 may vary in a wide range from Vcv to Vcp. That is, the difference between Vcp and Vcv is large and thus $Vcp^2 - Vcv^2$ is large. Therefore, when storing the same power, the energy-storage capacitor 13 has a small capacity C, so that the capacity C of the energy-storage capacitor 13 is reduced. Compared with the solution of the driving circuit with no bidirectional converter, the solution of the present disclosure has the following advantages. The energy-storage capacitor is charged and supplies power to the load via the bidirectional converter, the voltage of the energy-storage capacitor varies in a wide range, so that the capacity of the energy-storage capacitor can be small when the same power is stored, thereby reducing the volume and the number of the energy-storage capacitor. The energy-storage capacitor 13 according to the present disclosure is a capacitor with a small capacity, or formed by multiple capacitors with a smaller capacity connected in parallel with each other, which is not limited in the present disclosure.

In an embodiment, when a voltage across two terminals at a first port of the bidirectional converter 14 is less than a first reference voltage, the load switches from the light load interval to the heavy load interval. The first port of the bidirectional converter 14 is coupled to the load, and a second end of the bidirectional converter is coupled to the energy-storage capacitor.

Furthermore, it is determined whether to enable the bidirectional converter 14, that is, whether to charge the energy-storage capacitor or whether to control the energy-storage capacitor to supply power to the load based on the voltage at the first port of the bidirectional converter 14 and the voltage of the energy-storage capacitor 13. The first port of the bidirectional converter 14 is coupled to the load. Specifically, when the voltage at the first port of the bidirectional converter 14 is less than the first reference voltage, the bidirectional converter 14 is enabled, that is, the energy-storage capacitor is charged or supplies power to the load. When the voltage of the energy-storage capacitor 13 is greater than a second reference voltage, the bidirectional converter 14 stops operating, so that the energy-storage capacitor 13 stops being charged or supplying power to the load. In an embodiment, the first reference voltage is equal to the second reference voltage.

Furthermore, the bidirectional converter 14 includes an inductor. When the bidirectional converter 14 is enabled, a magnitude and a direction of an inductor current are controlled based on an inductor current reference signal, to control the voltage at the first port of the bidirectional converter 14 to be equal to a third reference voltage. The inductor current reference signal is adjusted based on the voltage at the first port of the bidirectional converter 14. Specifically, when the voltage at the first port of the bidirectional converter 14 is greater than the third reference voltage, the inductor current reference signal is controlled to increase, so that power transmitted from the first port of the bidirectional converter 14 to the energy-storage capacitor 13 increases. When the voltage at the first port of the bidirectional converter 14 is less than the third reference voltage, the inductor current reference signal is controlled to decrease, so that the power transmitted from the first port of the bidirectional converter 14 to the energy-storage capacitor 13 decreases, or power is transmitted from the energy-storage capacitor 13 to the first port of the bidirectional converter 14. In an embodiment, the third reference voltage is greater than a threshold voltage $V_{UVLO}$, and the threshold voltage $V_{UVLO}$ is a minimum output voltage of the first power converter 11.

Figure 5:
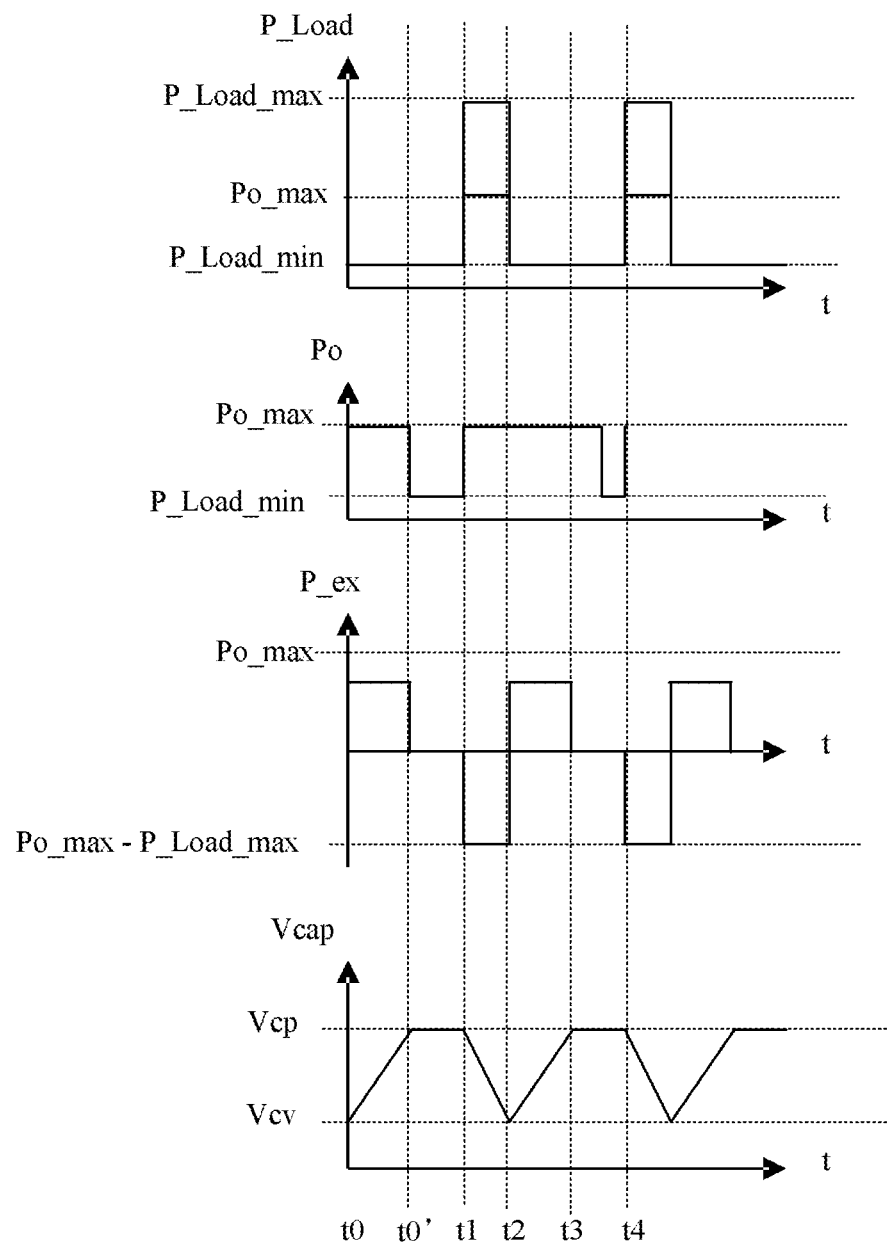
FIG. 5 is a schematic diagram showing an operation waveform of a driving circuit according to an embodiment of the present disclosure.

FIG. 5 shows an illustrative operation waveform of the driving circuit according to an embodiment of the present disclosure. P_Load represents power required by the load 12, Po represents output power of the first power converter 11, P_ex represents power at the first port of the bidirectional converter 14, Vcap represents a voltage of the energy-storage capacitor 13, P_Load_max represents maximum power required by the load 12, Po_max represents maximum output power of the first power converter 11, and P_Load_min represents minimum power required by the load 12.

During a time interval from a time instant t0 to a time instant t1 (or a time interval from a time instant t2 to a time instant t4), the power P_Load required by the load 12 is less than the maximum output power Po_max of the first power converter 11.

During a time interval from a time instant t0 to a time instant t0', the first power converter 11 not only supplies power to the load 12, but also charges the energy-storage capacitor 13. The first power converter 11 charges the energy-storage capacitor 13 via the bidirectional converter 14, so that the voltage Vcap of the energy-storage capacitor 13 increases from $V_{CV}$ to $V_{CP}$. During this time interval, the output power Po of the first power converter 11 is equal to a sum of the power P_Load required by the load 12 and the power P_ex (which is greater than zero, that is, P_ex is input power) to the first port of the bidirectional converter 14. During a time interval from a time instant t0' to a time instant t1, the bidirectional converter 14 does not operate, so the voltage of the energy-storage capacitor remains at $V_{CP}$, and the first power converter 11 supplies power to the load 12 only. During this time interval, the power P_ex inputted to the first port of the bidirectional converter 14 is equal to zero, and the output power Po of the first power converter 11 is equal to the power P_Load required by the load 12.

During a time interval from the time instant t1 to the time instant t2, the power P_Load required by the load 12 is greater than the maximum output power Po_max of the first power converter 11. The power required by the load 12 is provided by the first power converter 11 and the energy-storage capacitor 13. The energy-storage capacitor 13 supplies power to the load 12 via the bidirectional converter 14, so that the voltage of the energy-storage capacitor 13 decreases from Vcp to Vcv. During this time interval, the power P_Load required by the load 12 is equal to a sum of the output power Po of the first power converter 11 and an absolute value of the power P_ex (which is less than zero, that is, P_ex is an output power) from the first port of the bidirectional converter 14.

During a part of the light load interval, the first power converter 11 charges the energy-storage capacitor 13 via the bidirectional converter 14. During the heavy load interval, the energy-storage capacitor 13 supplies, via the bidirectional converter 14, the load 12 with power that is a difference between the power required by the load 12 and the maximum output power Po_max of the first power converter 11, so that the driving circuit shown in FIG. 4 drives the load requiring low average power and high peak power.

In addition, during the light load interval, the power stored in the energy-storage capacitor 13 is required to be greater than the difference between the power required by the load 12 and the maximum output power Po_max of the first power converter 11 during the heavy load interval. As shown in FIG. 5, the rising range and the falling range of the voltage of the energy-storage capacitor 13 are the same, i.e., between Vcp and Vcv. However, the rising range and the falling range of the voltage of the energy-storage capacitor 13 according to the present disclosure are not required to be the same, as described herein.

Figure 6:
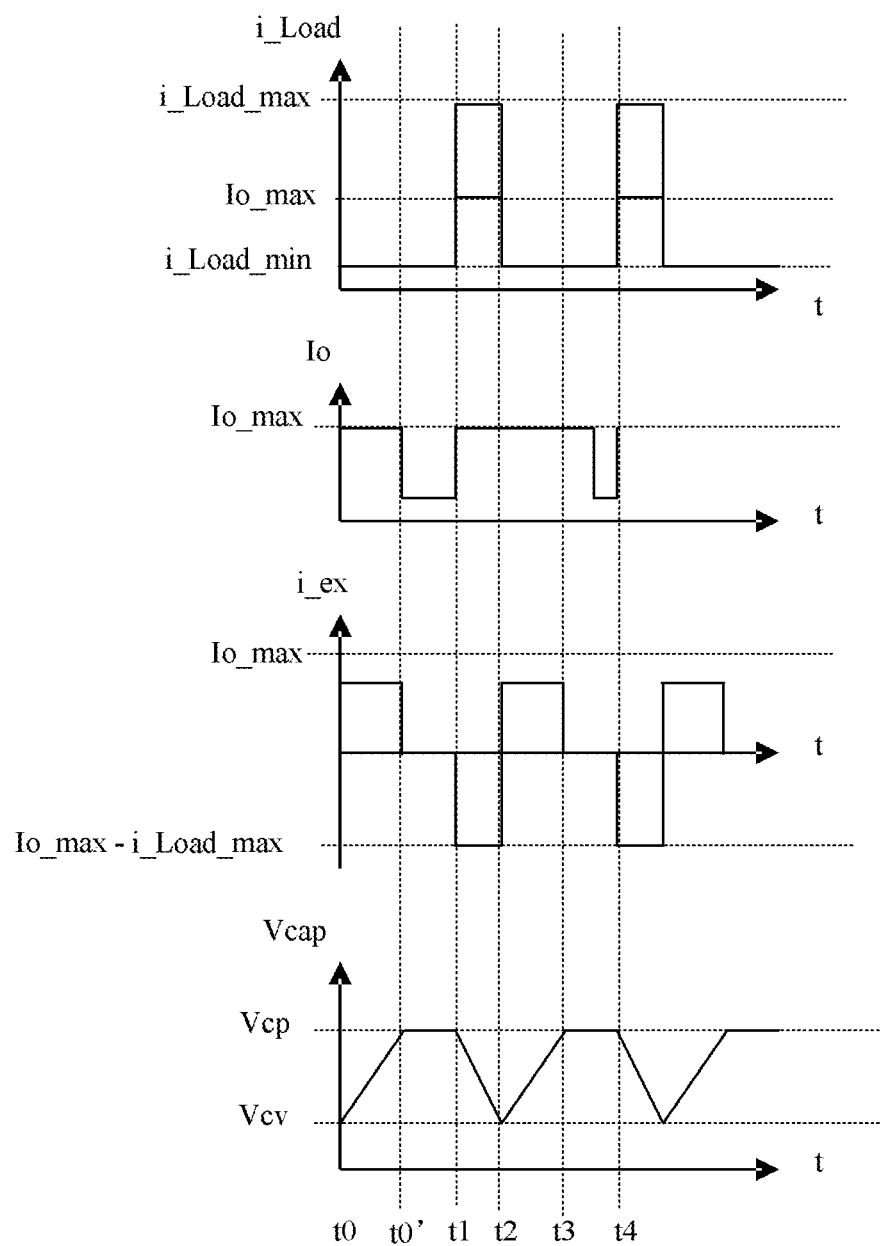
FIG. 6 is a schematic diagram showing an operation waveform of a driving circuit according to another embodiment of the present disclosure.

FIG. 5 shows time-varying waveforms of the output power Po of the first power converter, the power P_ex from the first port of the bidirectional converter 14 and the power P_Load required by the load 12, each of which are adjusted by adjusting a voltage and/or a current corresponding to the power. An exemplary control method is provided in the following description according to the present disclosure, that is, the voltage at the first port of the bidirectional converter 14 is controlled to be relatively constant (that is, the voltage at the first port of the bidirectional converter 14 is controlled to be equal to the third reference voltage), so that the corresponding power is adjusted by adjusting a current, which is not limited in the present disclosure. Furthermore, the voltage required by the load 12, the output voltage of the first power converter 11 and the voltage at the first port of the bidirectional converter are equal, so that the voltage of the load 12, the output voltage of the first power converter 11 and the voltage at the first port of the bidirectional converter are relatively constant in this control. Therefore, the operation waveform in FIG. 5 is converted into a time-varying operation waveform of a current corresponding to the power as shown in FIG. 6. As shown in FIG. 6, during the light load interval, an output current Io of the first power converter 11 is equal to a sum of a current i_Load flowing through the load and a current i_ex flowing through the first port of the bidirectional converter 14. During the heavy load interval, the current i_Load flowing through the load is equal to a sum of the output current Io of the first power converter and an absolute value of a current i_ex flowing through the first port of the bidirectional converter. Since the operation waveforms in FIG. 6 and FIG. 5 are exactly the same except that the power is converted into the current corresponding to the power, and operation processes are described in combination with the operation waveforms in FIG. 6 in the following embodiments, which is not described redundantly herein.

Figure 7:
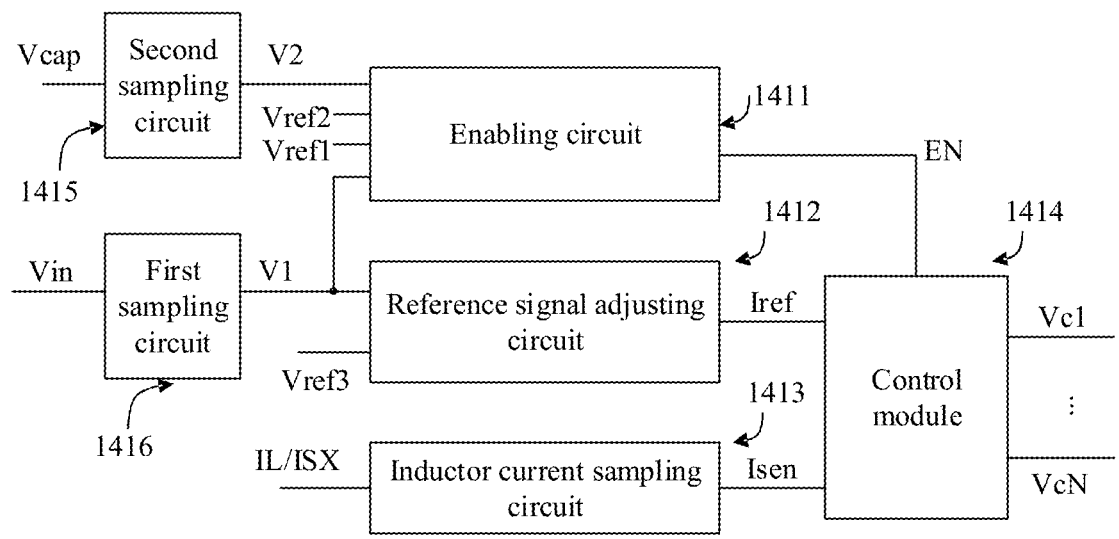
FIG. 7 is a schematic diagram showing a control circuit for a driving circuit according to an embodiment of the present disclosure.

FIG. 7 is a schematic diagram showing a control circuit for the driving circuit according to the present disclosure. The control circuit includes an enabling circuit 1411, a reference signal adjusting circuit 1412, an inductor current sampling circuit 1413 and a control module 1414.

The enabling circuit 1411 receives a first sampling signal V1 characterizing a voltage Vin at the first port of the bidirectional converter 14, a second sampling signal V2 characterizing the voltage Vcap of the energy-storage capacitor 13, a first reference voltage signal Vref1 and a second reference voltage signal Vref2, and outputs a first enabling signal EN. When the first sampling signal V1 is less than the first reference voltage signal Vref1, the first enabling signal EN is valid and the bidirectional converter 14 is enabled. When the second sampling signal V2 is greater than the second reference voltage signal Vref2, the first enabling signal EN is invalid and the bidirectional converter 14 is disabled. In an embodiment, the first reference voltage signal Vref1 is equal to the second reference voltage signal Vref2, and in another embodiment, the first reference voltage signal Vref1 is different from the second reference voltage signal Vref2, which is not limited in the present disclosure. For the convenience of the following description, the first reference voltage signal Vref1 and the second reference voltage signal Vref2 are described as one reference voltage signal, that is, the first reference voltage signal Vref1, as described herein.

The bidirectional converter 14 includes the inductor. The reference signal adjusting circuit 1412 receives the first sampling signal V1 and a third reference voltage signal Vref3, adjusts an inductor current reference signal Iref and outputs the adjusted inductor current reference signal Iref, to adjust a current flowing through the inductor. Moreover, a maximum of the inductor current reference signal Iref and a minimum of the inductor current reference signal Iref are set in the reference signal adjusting circuit 1412. The inductor current reference signal Iref is adjusted based on the first sampling signal V1. Specifically, when the first sampling signal V1 is greater than the third reference voltage signal Vref3, the inductor current reference signal Iref is controlled to increase, so that the power transmitted from the first port of the bidirectional converter 14 to the energy-storage capacitor 13 increases. When the first sampling signal V1 is less than the third reference voltage signal Vref3, the inductor current reference signal Iref is controlled to decrease, so that the power transmitted from the first port of the bidirectional converter 14 to the energy-storage capacitor 13 decreases, or power is transmitted from the energy-storage capacitor 13 to the first port of the bidirectional converter 14. In an embodiment, the third reference voltage signal Vref3 is greater than a threshold voltage $V_{UVLO}$, and the threshold voltage $V_{UVLO}$ is a minimum output voltage of the first power converter 11.

The inductor current sampling circuit 1413 samples a first current characterizing the inductor current, and adds a direct current bias to the first current, to output a second current Isen. The second current is positive. In an embodiment, a direction that the first current flows from the bidirectional converter 14 to the energy-storage capacitor 13 is defined as a positive direction. The first current serves as an inductor current sampling signal IL. In other embodiments, the first current serves as a sampling signal ISX of a current flowing through a corresponding power switch in the bidirectional converter 14. X ranges from 1 to N, and N represents the number of the power switches in the bidirectional converter 14.

The control module 1414 is configured to receive the inductor current reference signal Iref, the second current Isen and the first enabling signal EN. When the first enabling signal EN is valid, the control module 1414 outputs the control signals Vc1 to VcN to respectively control power switches S1 to SN in the bidirectional converter 14 to be turned on or turned off, so as to control the operation state of the bidirectional converter 14. Therefore, the magnitude and direction of the inductor current are controlled so that the second current Isen approximates to the inductor current reference signal Iref. Further, the first sampling signal V1 is controlled to be equal to the third reference voltage signal Vref3. It should be noted that the direction and the magnitude of the inductor current may be controlled in any manner according to the present disclosure, which is not limited in the present disclosure.

In addition, the control circuit further includes a first sampling circuit 1416 and a second sampling circuit 1415. The first sampling circuit 1416 is configured to generate the first sampling signal V1 that represents the voltage Vin cross the first port of the bidirectional converter 14. The second sampling circuit 1405 is configured to generate the second sampling signal V2 that represents the voltage Vcap of the energy-storage capacitor 13.

The control circuit according to the present disclosure has the following advantages. The control circuit is applicable to any type of bidirectional converters, and the control method is simple, so that the direction and magnitude of the inductor current are adaptively adjusted. Therefore, power can be transmitted smoothly from the first port of the bidirectional converter to the energy-storage capacitor, as well as from the energy-storage capacitor to the first port of the bidirectional converter.

Figure 8:
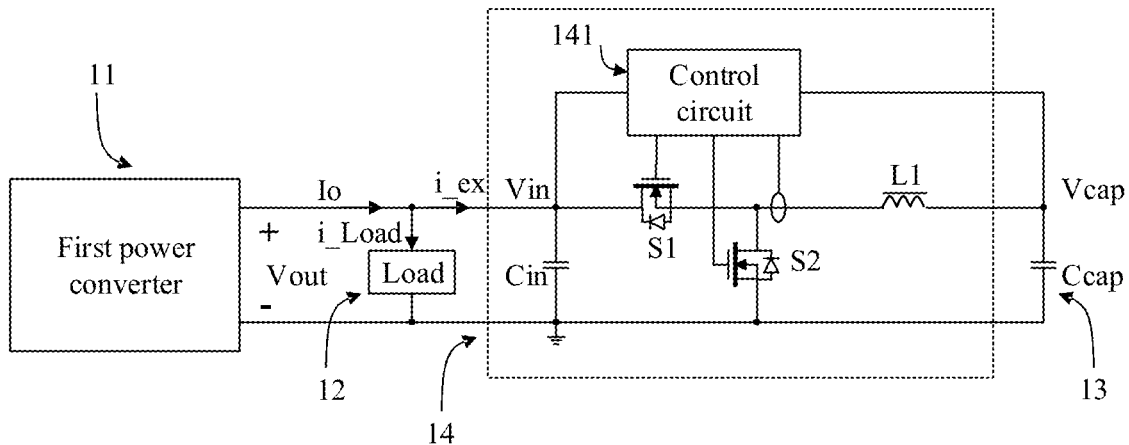
FIG. 8 is a schematic diagram showing a driving circuit according to a first embodiment of the present disclosure.

FIG. 8 is a schematic diagram showing a driving circuit according to a first embodiment of the present disclosure. The driving circuit includes a first power converter 11, an energy-storage capacitor 13 and a bidirectional converter 14. The output port of the first power converter 11 is coupled to the load 12 and the energy-storage capacitor 13. The energy-storage capacitor 13 is connected in parallel with the load 12. The bidirectional converter 14 is coupled between the load 12 and the energy-storage capacitor 13.

In this embodiments, the bidirectional converter 14 is a bidirectional buck converter as an example. The bidirectional converter 14 includes a buck circuit and a control circuit 141. The buck circuit includes a first power switch S1, a second power switch S2 and a first inductor L1. The first power switch S1 is connected in series with the second power switch S2 between two terminals at the first port of the bidirectional converter 14. One terminal of the first inductor L1 is connected to a common terminal of the first power switch S1 and the second power switch S2. The other terminal of the first inductor L1 is connected to a positive terminal of the energy-storage capacitor 13. In an embodiment, the buck circuit further includes an input capacitor Cin. The input capacitor Cin is configured to filter an input signal (such as a voltage or a current) at the first port of the bidirectional converter 14. The control circuit 141 is configured to receive the sampling signal characterizing the inductor current, the voltage Vin at the first port of the bidirectional converter 14 and the voltage Vcap of the energy-storage capacitor 13. The control circuit 141 generates control signals to control terminals of the first power switch S1 and the second power switch S2, to control switching states of the first power switch S1 and the second power switch S2.

Figure 9:
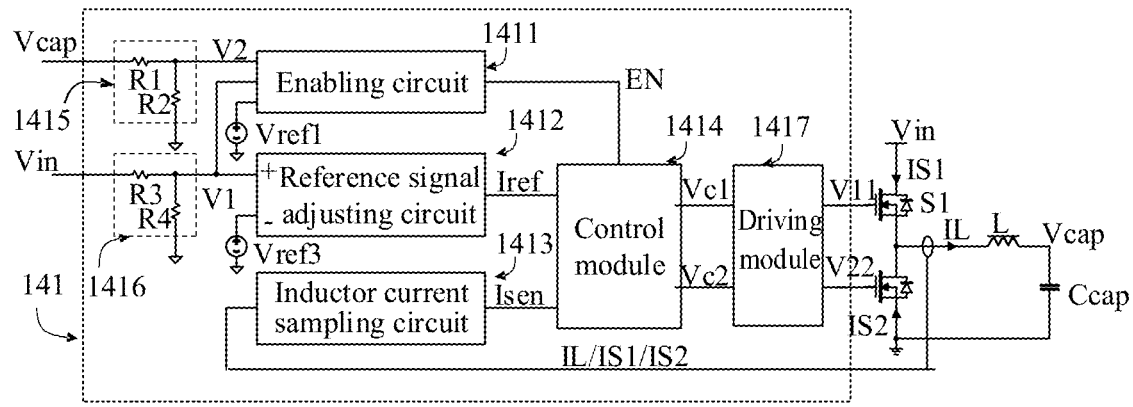
FIG. 9 is a schematic diagram showing a control circuit according to the first embodiment of the present disclosure.

Specifically, FIG. 9 is a schematic diagram showing control circuit according to the first embodiment of the present disclosure. The control circuit 141 includes an enabling circuit 1411, a reference signal adjusting circuit 1412, an inductor current sampling circuit 1413 and a control module 1414.

The enabling circuit 1411 receives a first sampling signal V1 characterizing the voltage Vin at the first port of the bidirectional converter 14, a second sampling signal V2 characterizing the voltage Vcap of the energy-storage capacitor 13 and a first reference voltage signal Vref1, and outputs a first enabling signal EN. When the first sampling signal V1 is less than the first reference voltage signal Vref1, the first enabling signal EN is valid and the bidirectional converter 14 is enabled. When the second sampling signal V2 is greater than the first reference voltage signal Vref1, the first enabling signal EN is invalid and the bidirectional converter 14 is disabled. In the embodiment, the first reference voltage signal Vref1 is greater than or equal to Vcp.

The reference signal adjusting circuit 1412 receives the first sampling signal V1 and a third reference voltage signal Vref3, adjusts an inductor current reference signal Iref and outputs the adjusted inductor current reference signal Iref. Moreover, a maximum of the inductor current reference signal Iref and a minimum of the inductor current reference signal Iref are set in the reference signal adjusting circuit 1412. The inductor current reference signal Iref is adjusted based on the first sampling signal V1. Specifically, when the first sampling signal V1 is greater than the third reference voltage signal Vref3, the inductor current reference signal Iref is controlled to increase, so that the power transmitted from the first port of the bidirectional converter 14 to the energy-storage capacitor 13 increases. When the first sampling signal V1 is less than the third reference voltage signal Vref3, the inductor current reference signal Iref is controlled to decrease, so that the power transmitted from the first port of the bidirectional converter 14 to the energy-storage capacitor 13 decreases, or power is transmitted from the energy-storage capacitor 13 to the first port of the bidirectional converter 14. In the embodiment, the first reference voltage signal Vref1 is less than the third reference voltage signal Vref3.

The inductor current sampling circuit 1413 samples the first current characterizing the inductor current, and adds a direct current bias to the first current to output the second current Isen. The second current Isen is positive. The first current serves as the inductor current sampling signal IL. In other embodiments, the first current serves as current sampling signal IS1 of a current flowing through a first power switch S1, or a current sampling signal IS2 of a current flowing through a second power switch S2 in the bidirectional converter 14. A direction that the inductor current flows from a common terminal of the first power switch S1 and the second power switch S2 to the energy-storage capacitor 13 is defined as a positive direction (as shown in FIG. 9). The positive direction (as shown in FIG. 9) of the current sampling signal IS1 of the current flowing through the first power switch S1 or the current sampling signal IS2 of the current flowing through the second power switch S2 corresponds to the positive direction of the inductor current.

The control module 1414 is configured to receive the inductor current reference signal Iref, the second current Isen and the first enabling signal EN. When the first enabling signal EN is valid, the control module 1414 outputs the control signals Vc1 and Vc2 to control the first power switch S1 and the second power switch S2 to be turned on or turned off, so as to control the operation state of the bidirectional converter 14. Therefore, the magnitude and direction of the inductor current are controlled so that the second current Isen approximates to the inductor current reference signal Iref. Further, the first sampling signal V1 is controlled to be equal to the third reference voltage signal Vref3. It should be noted that the direction and the magnitude of the inductor current may be controlled in any manner according to the present disclosure, which is not limited in the present disclosure.

In an embodiment, the control circuit further includes a driving module 1417. The driving module 1417 is configured to: generate, based on the control signal Vc1, a driving signal V11 for driving the first power switch S1; and generate, based on the control signal Vc2, a driving signal V22 for driving the second power switch S2.

In addition, the control circuit further includes a first sampling circuit 1416 and a second sampling circuit 1415. The first sampling circuit 1416 is configured to generate the first sampling signal V1 for characterizing the voltage Vin at the first port of the bidirectional converter 14. The second sampling circuit 1405 is configured to generate the second sampling signal V2 for characterizing the voltage Vcap of the energy-storage capacitor 13. As shown in FIG. 9, the first sampling circuit 1416 and the second sampling circuit 1415 are each formed by a voltage dividing circuit. The first sampling circuit 1416 includes a third resistor R3 and a fourth resistor R4. The third resistor R3 is connected in series with the fourth resistor R4 between the two terminals at the first port of the bidirectional converter 14. The first sampling signal V1 is a voltage at a common terminal of the third resistor R3 and the fourth resistor R4. The second sampling circuit 1415 includes a first resistor R1 and a second resistor R2. The first resistor R1 is connected in series with the second resistor R2 between two terminals of the energy-storage capacitor 13. The second sampling signal V2 is a voltage of a common terminal of the first resistor R1 and the second resistor R2. The first sampling circuit 1416 and the second sampling circuit 1415 may be implemented in other forms, which are not limited in the present disclosure.

The operation process in the first embodiment is described with reference to FIG. 8 and FIG. 6. The bidirectional converter 14 operates as the buck circuit when operating in the forward direction and operates as a boost circuit when operating in the reverse direction, and thus there is a relationship of Vcv<Vcp<Vin.

During the time interval from the time instant t0 to the time instant t0', the bidirectional converter 14 operates in the forward direction and operates in a buck state. The current i_ex flowing through the first port of the bidirectional converter 14 flows from the first port of the bidirectional converter 14 to the energy-storage capacitor 13 to charge the energy-storage capacitor 13. The voltage of the energy-storage capacitor 13 increases from Vcv to Vcp. The current i_Load flowing through the load and the current i_ex flowing through the first port of the bidirectional converter 14 are provided by the first power converter 11.

During the time interval from the time instant t0' to the time instant t1, the bidirectional converter 14 does not operate. The current i_Load flowing through the load is provided by the first power converter 11.

During the time interval from the time instant t1 to the time instant t2, the bidirectional converter 14 operates in the reverse direction and operates in a boost state. The current i_ex flowing through the first port of the bidirectional converter 14 flows from the energy-storage capacitor 13 to the first port of the bidirectional converter 14, so that the energy-storage capacitor 13 supplies power to the load 12 and the voltage of the energy-storage capacitor 13 decreases from Vcp to Vcv. The current i_Load flowing through the load is provided by the bidirectional converter 14 and the first power converter 11.

Figure 10:
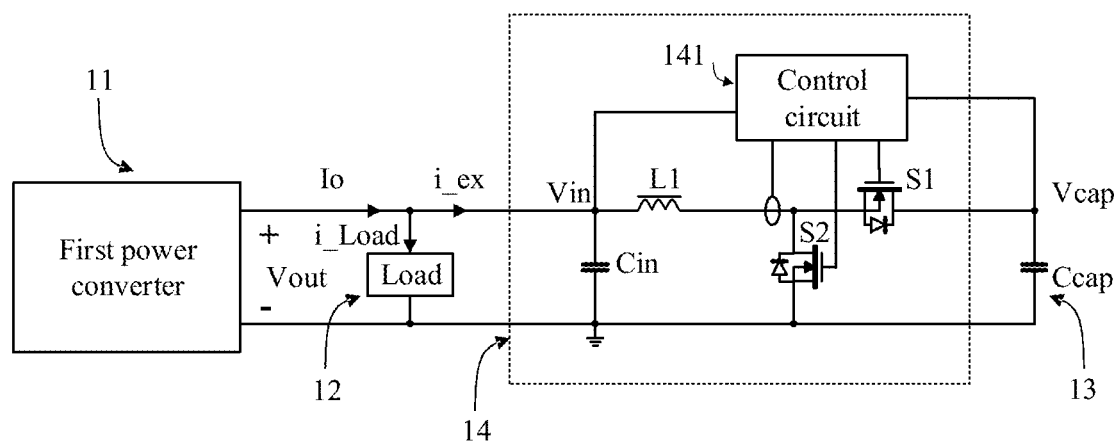
FIG. 10 is a schematic diagram showing a driving circuit according to a second embodiment of the present disclosure.
Figure 11:
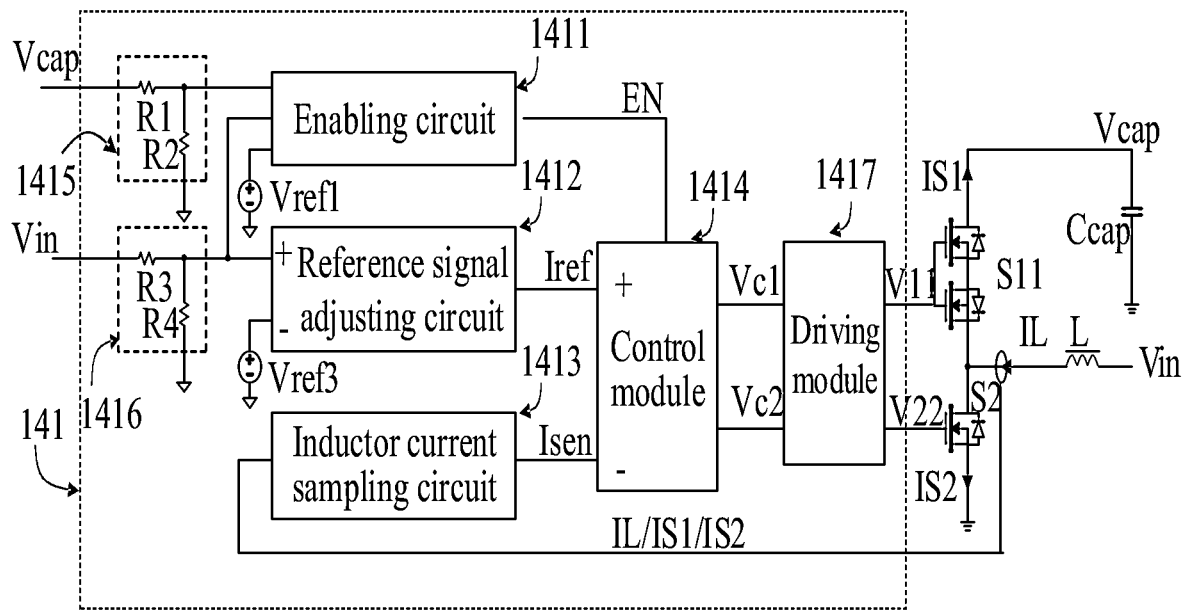
FIG. 11 is a schematic diagram showing a control circuit according to the second embodiment of the present disclosure.

FIG. 10 is a schematic diagram showing a driving circuit according to a second embodiment of the present disclosure. FIG. 11 is a schematic diagram of a control circuit according to the second embodiment of the present disclosure. The second embodiment is different from the first embodiment in the following first and second aspects.

In the first aspect, the bidirectional converter 14 is a bidirectional boost converter. The bidirectional converter includes a boost circuit and a control circuit 141. The boost circuit includes a first power switch S1, a second power switch S2 and a first inductor L1. One terminal of the first inductor L1 is connected to the positive terminal at the first port of the bidirectional converter 14. The other terminal of the first inductor L1 is connected to a first terminal of the first power switch S1. A second terminal of the first power switch is connected to the positive terminal of the energy-storage capacitor 13. A second terminal of the second power switch S2 is connected to a common terminal of the first inductor L1 and the first power switch S1. A first terminal of the second power switch S2 is grounded.

In the second aspect, a direction that the inductor current in the bidirectional converter 14 flows from the first port of the bidirectional converter 14 to the common terminal of the first power switch S1 and the second power switch S2 is defined as a positive direction (as shown in FIG. 11). The positive direction (as shown in FIG. 11) of a current sampling signal IS1 of a current flowing through the first power switch S1 or a current sampling signal IS2 of a current flowing through the second power switch S2 corresponds to the positive direction of the inductor current.

The operation process in the second embodiment is described with reference to FIG. 10 and FIG. 6. The bidirectional converter 14 operates as the boost circuit when operating in the forward direction and operates as the buck circuit when operating in the reverse direction, and thus there is a relationship of Vin<Vcp<Vcv.

During the time interval from the time instant t0 to the time instant t0', the bidirectional converter 14 operates in the forward direction and operates in a boost state. The current i_ex flowing through the first port of the bidirectional converter 14 flows from the first port of the bidirectional converter 14 to the energy-storage capacitor 13 to charge the energy-storage capacitor 13. The voltage of the energy-storage capacitor 13 increases from Vcv to Vcp. The current i_Load flowing through the load and the current i_ex flowing through the first port of the bidirectional converter 14 are provided by the first power converter 11.

During the time interval from the time instant t0' to the time instant t1, the bidirectional converter 14 does not operate. The current i_Load flowing through the load is provided by the first power converter 11.

During the time interval from the time instant t1 to the time instant t2, the bidirectional converter 14 operates in the reverse direction and operates in the buck state. The current i_ex flowing through the first port of the bidirectional converter 14 flows from the energy-storage capacitor 13 to the first port of the bidirectional converter 14, so that the energy-storage capacitor 13 supplies power to the load 12 and the voltage of the energy-storage capacitor 13 decreases from Vcp to Vcv. The current i_Load flowing through the load is provided by the bidirectional converter 14 and the first power converter 11.

Furthermore, the driving circuit further includes a current limiting circuit according to the second embodiment. The current limiting circuit is configured to limit a surge current, that is, a maximum current, of the bidirectional converter. In an embodiment, the current limiting circuit is a surge current limiter. In an embodiment, the surge current limiter is formed by a power switch (or, a switch transistor) and the power switch operates in a linear state. Resistance of the power switch is controlled to increase by reducing a voltage of a control terminal of the power switch, so as to limit the maximum current. The current limiting circuit is configured to limit the maximum current when the bidirectional converter operates in the forward direction or in the reverse direction. In the second embodiment, the current limiting circuit is configured to limit a maximum input current or a maximum output current when the bidirectional converter operates in the boost state in the forward direction. Specifically, the current limiting circuit is configured to limit the surge current when the bidirectional converter operates in the boost state in the forward direction and the bidirectional converter is powered on, that is, during a process that the voltage of the energy-storage capacitor 13 increases from 0 to Vin.

Figure 12:
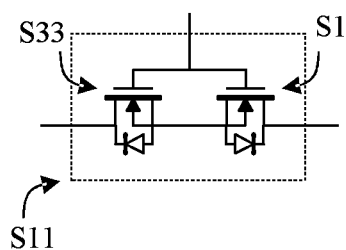
FIG. 12 is a schematic diagram showing a current limiting circuit according to the second embodiment of the present disclosure.

As shown in FIG. 12, the current limiting circuit in the second embodiment is a power switch (that is, a switch transistor) S33. The power switch S33 is coupled in series with the first power switch S1 to form a bidirectional switch S11, to replace the first power switch S1 in FIG. 10. Specifically, a first terminal of the power switch S33 is connected to a first terminal of the first power switch S1, and a control terminal of the power switch S33 is connected to a control terminal of the first power switch S1. The current limiting circuit shown in FIG. 12 is configured to limit the maximum output current when the bidirectional converter operates in the boost state in the forward direction, and is further configured to provide short-circuit protection for the energy-storage capacitor 13. The power switch S33 operates in a linear state. As shown in FIG. 11, the control module 1414 of the control circuit 141 controls resistance of the power switch S33 by controlling the voltage of the control terminal of the power switch S33, so as to control the maximum output current.

Figure 13:
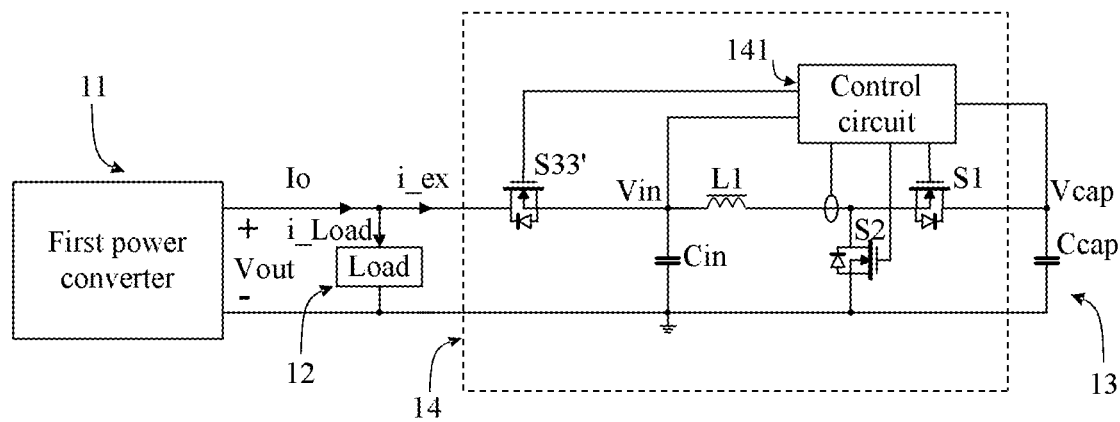
FIG. 13 is a schematic diagram showing another current limiting circuit according to the second embodiment of the present disclosure.

Furthermore, the current limiting circuit according to the second embodiment may be connected to other parts of the driving circuit. As shown in FIG. 13, the current limiting circuit is a power switch (that is, a switch transistor) S33'. The power switch S33' is coupled between the first port of the bidirectional converter 14 and the load 12. The current limiting circuit in FIG. 13 is configured to limit the maximum input current when the bidirectional converter operates in the boost state in the forward direction. Since the bidirectional converter is the bidirectional boost converter, the voltage at the first port of the bidirectional converter is lower than the voltage of the energy-storage capacitor. Therefore, a withstand voltage required by the power switch S33' in FIG. 13 is lower than a withstand voltage required by the power switch S33 in FIG. 12, so that a current limiting device with a lower withstand voltage is arranged in the driving circuit in FIG. 13. The power switch S33' operates in a linear state. The control module 1414 of the control circuit 141 controls resistance of the power switch S33' by controlling the voltage of the control terminal of the power switch S33', so as to control the maximum input current.

Figure 14:
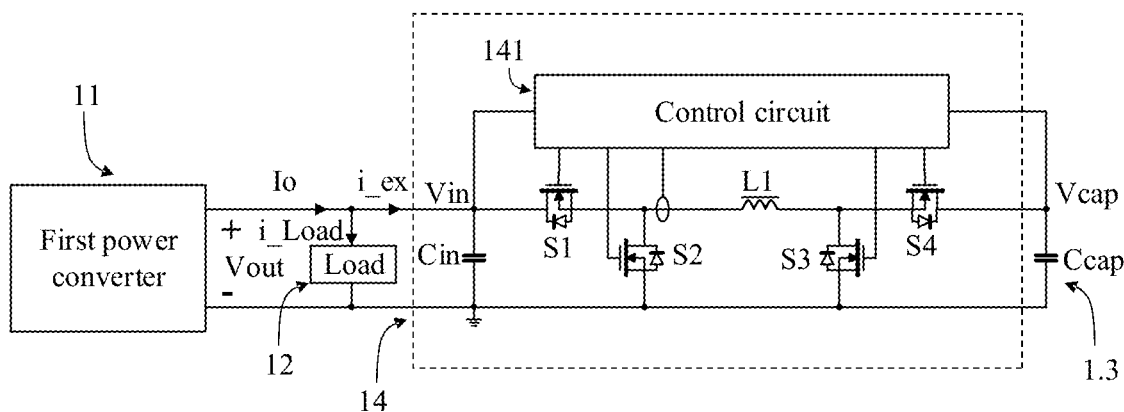
FIG. 14 is a schematic diagram showing a driving circuit according to a third embodiment of the present disclosure.
Figure 15:
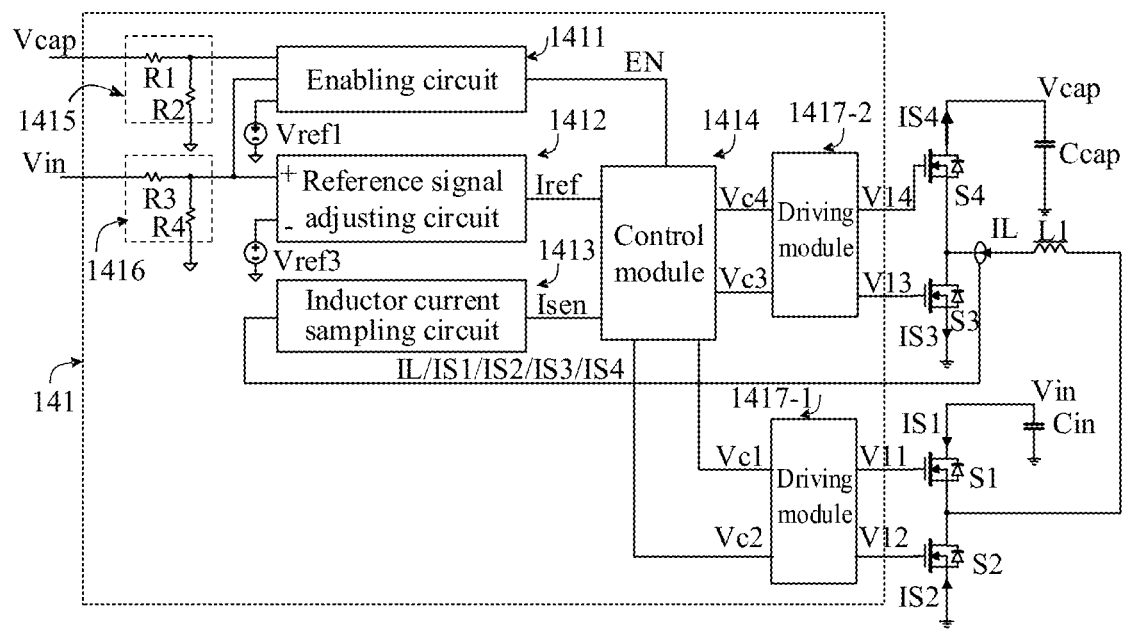
FIG. 15 is a schematic diagram showing a control circuit according to the third embodiment of the present disclosure.

FIG. 14 is a schematic diagram showing a driving circuit according to a third embodiment of the present disclosure. FIG. 15 is a schematic diagram showing a control circuit according to the third embodiment of the present disclosure. The third embodiment is different from the first embodiment in the following first to third aspects.

In a first aspect, the bidirectional converter 14 is a bidirectional buck-boost converter. The bidirectional converter includes a buck-boost circuit and a control circuit 141. The buck-boost circuit includes a first power switch S1, a second power switch S2, a third power switch S3, a fourth power switch S4 and a first inductor L1. The first power switch S1 is connected in series with the second power switch between two terminals at the first port of the bidirectional converter 14. One terminal of the first inductor L1 is connected to a common terminal of the first power switch S1 and the second power switch S2. The other terminal of the first inductor L1 is connected to a first terminal of the fourth power switch S4. A second terminal of the fourth power switch S4 is connected to the positive terminal of the energy-storage capacitor 13. A second terminal of the third power switch S3 is connected to a common terminal of the first inductor L1 and the fourth power switch S4. A first terminal of the third power switch S3 is grounded.

In a second aspect, the control module 1414 is configured to receive the inductor current reference signal Iref, the second current Isen and the first enabling signal EN. When the first enabling signal EN is valid, the control module 1414 outputs control signals Vc1, Vc2, Vc3 and Vc4 to respectively control the first power switch S1, the second power switch S2, the second power switch S3 and the fourth power switch S4 to be turned on or turned off, so as to control the operation state of the bidirectional converter 14.

In a third aspect, the first current serves as a current sampling signal IS1 of a current flowing through the first power switch S1, a current sampling signal IS2 of a current flowing through the second power switch S2, a current sampling signal IS3 of a current flowing through the third power switch S3 or a current sampling signal IS4 of a current flowing through the fourth power switch S4, in the bidirectional converter 14. In the control circuit 141, a direction that the inductor current flows from the common terminal of the first power switch S1 and the second power switch S2 to a common terminal of the third power switch S3 and the fourth power switch S4 is defined as a positive direction (as shown in FIG. 15). The positive direction (as shown in FIG. 15) of the current sampling signal IS1 of the current flowing through the first power switch S1, the current sampling signal IS2 of the current flowing through the second power switch S2, the current sampling signal IS3 of the current flowing through the third power switch S3 or the fourth sampling signal IS4 of the current flowing through the fourth power switch S4 corresponds to the positive direction of the inductor current.

The operation process in the third embodiment is described with reference to FIG. 14 and FIG. 6. The bidirectional converter 14 is the bidirectional buck-boost converter, and thus there is a relationship of Vcv<Vin<Vcp.

During the time interval from the time instant t0 to the time instant t0', the bidirectional converter 14 operates in the forward direction and operates in a buck-boost state. Specifically, during a time interval in which the voltage Vcap of the energy-storage capacitor 13 increases from Vcv to Vin, the first inductor L1, the first power switch S1 and the second power switch S2 form a buck circuit, which operates in the buck state. The third power switch S3 is always turned off and the fourth power switch S4 is always turned on. During a time interval in which the voltage Vcap of the energy-storage capacitor 13 increases from Vin to Vcp, the first inductor L1, the third power switch S3 and the fourth power switch S4 form a boost circuit, which operates in a boost state. The first power switch S1 is always turned on and the second power switch S2 is always turned off. During this time interval, the current i_ex flowing through the first port of the bidirectional converter 14 flows from the first port of the bidirectional converter 14 to the energy-storage capacitor 13, to charge the energy-storage capacitor 13, so that the voltage of the energy-storage capacitor 13 increases from Vcv to Vcp. The current i_Load flowing through the load and the current i_ex flowing through the first port of the bidirectional converter 14 are provided by the first power converter 11.

During the time interval from the time instant t0' to the time instant t1, the bidirectional converter 14 does not operate. The current i_Load flowing through the load is provided by the first power converter 11.

During the time interval from the time instant t1 to the time instant t2, the bidirectional converter 14 operates in the reverse direction and operates in the buck-boost state. Specifically, during a time interval in which the voltage Vcap of the energy-storage capacitor 13 decreases from Vcp to Vin, the first inductor L1, the third power switch S3 and the fourth power switch S4 form a buck circuit, which operates in the buck state. The first power switch S1 is always turned on and the second power switch S2 is always turned off. During a time interval in which the voltage Vcap of the energy-storage capacitor 13 decreases from Vin to Vcv, the first inductor L1, the first power switch S1 and the second power switch S2 form a boost circuit, which operates in the boost state. The third power switch S3 is always turned off and the fourth power switch S4 is always turned on. During this time interval, the current i_ex flowing through the first port of the bidirectional converter 14 flows from the energy-storage capacitor 13 to the first port of the bidirectional converter 14, so that the energy-storage capacitor 13 supplies power to the load 12 and the voltage of the energy-storage capacitor 13 decreases from Vcp to Vcv. The current i_Load flowing through the load is provided by the bidirectional converter 14 and the first power converter 11.

Furthermore, the driving circuit further includes a current limiting circuit according to the third embodiment. The current limiting circuit is configured to limit a maximum current when the bidirectional converter operates in the forward direction or in the reverse direction. In an embodiment, the current limiting circuit is a surge current limiter. In the third embodiment, the current limiting circuit is configured to limit a maximum input current or a maximum output current when the bidirectional converter operates in the forward direction. Specifically, the current limiting circuit is configured to limit a surge current when the bidirectional converter operates in the forward direction and the bidirectional converter is just powered on, that is, in the process that the voltage of the energy-storage capacitor 13 increases from 0 to Vin.

In an embodiment, in a case that the bidirectional converter 14 operates in the forward direction, and the first inductor L1, the third power switch S3 and the fourth power switch S4 form the boost circuit, the first power switch S1 is multiplexed to serve as the current limiting circuit to limit the maximum input current when the bidirectional converter operates in the boost state in the forward direction. In a case that the first power switch S1 serves as the current limiting circuit, the first power switch S1 operates in the linear state. The control module 1414 of the control circuit 141 controls resistance of the first power switch S1 by controlling the voltage of the control terminal of the first power switch S1, so as to control the maximum input current.

Furthermore, the current limiting may be implemented in other forms according to the third embodiment. The bidirectional converter 14 operates in the forward direction, the control module 1414 of the control circuit 141 controls the first power switch S1 to operate in a pulse width modulation (PWM) state, and controls the second power switch S2 to operate as a diode, so as to achieve the current limiting. Specifically, in such case, the first inductor L1, the first power switch S1 and the second power switch S2 form the buck circuit, which operates in a buck limiting state. Therefore, the buck circuit serves as the current limiting circuit. The third power switch S3 is always turned off, and the fourth power switch S4 is always turned on, to control the maximum input current.

In addition, the power switches in the embodiment of the present disclosure are implemented by various existing electrically controllable switching devices, such as a metal oxide semiconductor field effect transistor (MOSFET), a bipolar junction transistor (BJT), or an insulated gate bipolar transistor (IGBT). The type of the power switch is not limited in the present disclosure.

A driving method is further provided according to an embodiment of the present disclosure. The driving method is applied to a driving circuit. The driving circuit includes a bidirectional converter, a first power converter and an energy-storage capacitor. An output port of the first power converter is coupled with a load and the energy-storage capacitor. The energy-storage capacitor is connected in parallel with the load. The bidirectional converter is coupled between the load and the energy-storage capacitor. The method includes:

supplying, by the first power converter, power to the load during a light load interval and a heavy load interval;

charging, by the first power converter, the energy-storage capacitor via the bidirectional converter during at least a part of the light load interval; and supplying, by the energy-storage capacitor, power to the load via the bidirectional converter during the heavy load interval.

When a voltage at a first port of the bidirectional converter is less than a first reference voltage, the load switches from the light load interval to the heavy load interval. The first port of the bidirectional converter is coupled to the load.

In an embodiment, during a part of the light load interval, the first power converter charges the energy-storage capacitor via the bidirectional converter. During other part of the light load interval, the bidirectional converter does not operate, and the first power converter does not charge the energy-storage capacitor.

In an embodiment, during the light load interval, the first power converter charges the energy-storage capacitor via the bidirectional converter.

In an embodiment, an operation state of the bidirectional converter is controlled, so that the bidirectional converter operates in the forward direction during at least a part of the light load interval, and operates in the reverse direction during the heavy load interval.

Furthermore, the energy-storage capacitor is charged and supplies power to the load via the bidirectional converter, so that the voltage of the energy-storage capacitor varies in a wide range, thereby reducing a capacity of the energy-storage capacitor.

Furthermore, it is determined whether to charge the energy-storage capacitor or whether to control the energy-storage capacitor to supply power to the load based on the voltage at the first port of the bidirectional converter and the voltage of the energy-storage capacitor. Specifically, when the voltage at the first port of the bidirectional converter is less than the first reference voltage, the bidirectional converter is enabled, so that the energy-storage capacitor is charged or supplies power to the load. When the voltage of the energy-storage capacitor greater than a second reference voltage, the bidirectional converter stops operating, so that the energy-storage capacitor stops being charged or supplying power to the load.

The bidirectional converter includes an inductor. In a case that the bidirectional converter is enabled, a magnitude and a direction of an inductor current are controlled based on an inductor current reference signal, so that the voltage at the first port of the bidirectional converter is equal to a third reference voltage. The inductor current reference signal is adjusted based on the voltage at the first port of the bidirectional converter. Specifically, when the voltage at the first port of the bidirectional converter is greater than the third reference voltage, the inductor current reference signal is controlled to increase, so that power transmitted from the first port of the bidirectional converter to the energy-storage capacitor increases. When the voltage at the first port of the bidirectional converter is less than the third reference voltage, the inductor current reference signal is controlled to decrease, so that the power transmitted from the first port of the bidirectional converter to the energy-storage capacitor decreases, or power is transmitted from the energy-storage capacitor to the first port of the bidirectional converter.

Although the above embodiments are described and explained separately, there are some common technologies between different embodiments. Those skilled in the art may replace and integrate these embodiments. For details not clearly described in an embodiment, one may refer to relevant details described in another embodiment.

The embodiments of the present disclosure are described above. Not all details are described in the embodiments, and the present disclosure is not limited to the described embodiments. Apparently, numerous modifications and variations may be made based on the above descriptions. The embodiments are selected and described in the specification to explain the principle and practical applications of the present disclosure well, so that those skilled in the art can make good use of the present disclosure and make modifications based on the present disclosure. The present disclosure is limited only by the claims, full scope and equivalents thereof.

The invention claimed is:

1. A driving circuit, comprising:
an energy-storage capacitor;
a first power converter, wherein an output port of the first power converter is coupled to a load, and the first power converter is configured to generate a direct current signal to supply power to the load during a light load interval and a heavy load interval; and
a bidirectional converter coupled between the load and the energy-storage capacitor; wherein
the first power converter is further configured to charge the energy-storage capacitor via the bidirectional converter during at least part of the light load interval; and
the energy-storage capacitor is configured to supply power to the load via the bidirectional converter during the heavy load interval.

2. The driving circuit according to claim 1, wherein when a voltage at a first port of the bidirectional converter is less than a first reference voltage, the light load interval is switched to the heavy load interval, wherein the first port of the bidirectional converter is coupled to the load.

3. The driving circuit according to claim 1, wherein the first power converter is configured to charge the energy-storage capacitor via the bidirectional converter during a part of the light load interval, wherein during other part of the light load interval, the bidirectional converter does not operate, and the first power converter does not charge the energy-storage capacitor.

4. The driving circuit according to claim 1, wherein the first power converter is configured to charge the energy-storage capacitor via the bidirectional converter during the light load interval.

5. The driving circuit according to claim 1, wherein an operation state of the bidirectional converter is controlled, to control:
the bidirectional converter to operate in a forward direction during the at least part of the light load interval; and
the bidirectional converter to operate in a reverse direction during the heavy load interval.

6. The driving circuit according to claim 1, wherein whether to charge the energy-storage capacitor or whether to control the energy-storage capacitor to supply power to the load is determined based on a voltage at a first port of the bidirectional converter and a voltage of the energy-storage capacitor.

7. The driving circuit according to claim 6, wherein when the voltage at the first port of the bidirectional converter is less than a first reference voltage, the bidirectional converter is enabled, and the energy-storage capacitor is charged or supplies power to the load; and
when the voltage of the energy-storage capacitor is greater than a second reference voltage, the bidirectional converter stops operating, and the energy-storage capacitor stops being charged or supplying power to the load.

8. The driving circuit according to claim 1, wherein the bidirectional converter comprises an inductor, wherein
in a case that the bidirectional converter is enabled, a magnitude and a direction of an inductor current are controlled based on an inductor current reference signal, to control a voltage at a first port of the bidirectional converter to be equal to a third reference voltage, wherein the inductor current reference signal is adjusted based on the voltage at the first port of the bidirectional converter.

9. The driving circuit according to claim 8, wherein when the voltage at the first port of the bidirectional converter is greater than the third reference voltage, the inductor current reference signal is controlled to increase, thereby increasing power transmitted from the first port of the bidirectional converter to the energy-storage capacitor; and
when the voltage at the first port of the bidirectional converter is less than the third reference voltage, the inductor current reference signal is controlled to decrease, thereby decreasing power transmitted from the first port of the bidirectional converter to the energy-storage capacitor, or controlling power to be transmitted from the energy-storage capacitor to the first port of the bidirectional converter.

10. The driving circuit according to claim 1, wherein during the light load interval, output power of the first power converter is equal to a sum of power required by the load and input power to a first port of the bidirectional converter; and
during the heavy load interval, the power required by the load is equal to a sum of output power of the first power converter and output power from the first port of the bidirectional converter.

11. The driving circuit according to claim 1, wherein during the light load interval, an output current of the first power converter is equal to a sum of a current flowing through the load and an input current at a first port of the bidirectional converter; and
during the heavy load interval, a current flowing through the load is equal to a sum of an output current of the first power converter and an output current at the first port of the bidirectional converter.

12. The driving circuit according to claim 1, further comprising: a control circuit, wherein the control circuit comprises an enabling circuit, wherein
the enabling circuit is configured to receive a first sampling signal characterizing a voltage at a first port of the bidirectional converter, a second sampling signal characterizing a voltage of the energy-storage capacitor, a first reference voltage signal and a second reference voltage signal; and generate a first enabling signal, wherein
when the first sampling signal is less than the first reference voltage signal, the first enabling signal is valid and the bidirectional converter is enabled, and
when the second sampling signal is greater than the second reference voltage signal, the first enabling signal is invalid and the bidirectional converter is disabled.

13. The driving circuit according to claim 12, wherein the bidirectional converter comprises an inductor, and the control circuit further comprises:
a reference signal adjusting circuit configured to receive the first sampling signal and a third reference voltage signal, and adjust an inductor current reference signal and output the adjusted inductor current reference signal;

an inductor current sampling circuit configured to sample a first current characterizing an inductor current, and add a direct current bias to the first current to generate a second current, wherein the second current is positive; and a control module configured to receive the inductor current reference signal, the second current and the first enabling signal, and generate a control signal to control an operation state of the bidirectional converter, so as to control a magnitude and a direction of the inductor current; wherein when the first sampling signal is greater than the third reference voltage signal, the inductor current reference signal is controlled to increase, thereby increasing power transmitted from the first port of the bidirectional converter to the energy-storage capacitor; and when the first sampling signal is less than the third reference voltage signal, the inductor current reference signal is controlled to decrease, thereby decreasing power transmitted from the first port of the bidirectional converter to the energy-storage capacitor, or controlling power to be transmitted from the energy-storage capacitor to the first port of the bidirectional converter.

14. The driving circuit according to claim 1, wherein, the bidirectional converter is a bidirectional buck converter, wherein in a case that the bidirectional converter operates in a forward direction, the bidirectional converter operates in a buck state; and in a case that the bidirectional converter operates in a reverse direction, the bidirectional converter operates in a boost state.

15. The driving circuit according to claim 1, wherein, the bidirectional converter is a bidirectional boost converter, wherein in a case that the bidirectional converter operates in a forward direction, the bidirectional converter operates in a boost state; and in a case that the bidirectional converter operates in a reverse direction, the bidirectional converter operates in a buck state.

16. The driving circuit according to claim 1, wherein, the bidirectional converter is a bidirectional buck-boost converter, wherein in a case that the bidirectional converter operates in a forward direction, the bidirectional converter operates in a buck state and a boost state sequentially; and in a case that the bidirectional converter operates in a reverse direction, the bidirectional converter operates in a buck state and a boost state sequentially.

17. The driving circuit according to claim 1, wherein, the bidirectional converter comprises a current limiting circuit, wherein the current limiting circuit is configured to limit a maximum input current or a maximum output current when the bidirectional converter operates in a forward direction.

18. The driving circuit according to claim 17, wherein, the bidirectional converter is the bidirectional boost converter, the current limiting circuit is coupled between a first port of the bidirectional converter and the load, to limit the maximum input current.

19. The driving circuit according to claim 17, wherein, the bidirectional converter is the bidirectional boost converter, and the bidirectional converter comprises a power switch, wherein, the power switch is coupled to the energy-storage capacitor, and the current limiting circuit is coupled to the power switch, to limit the maximum output current.

20. The driving circuit according to claim 17, wherein, the bidirectional converter is the bidirectional buck-boost converter, and the buck-boost converter comprises a power switch, wherein, the power switch is coupled to the load, and the power switch is multiplexed to serve as the current limiting circuit when the bidirectional converter operates in the boost state in a forward direction.

21. The driving circuit according to claim 17, wherein the current limiting circuit is formed by a power switch, wherein the power switch is configured to operate in a linear state, and resistance of the power switch is controlled by controlling a voltage of a control terminal of the power switch to control the maximum output current or the maximum input current.

22. The driving circuit according to claim 17, wherein, the bidirectional converter is the bidirectional buck-boost converter, and the buck-boost converter comprises an inductor, a first power switch and a second power switch, wherein the first power switch is coupled to the load, the second power switch is coupled to the first power switch, and the inductor is coupled to both the first power switch and the second power switch; and the first power switch is configured to operate in a pulse width modulation (PWM) state; the second power switch is configured to serve as a diode; and the first inductor, the first power switch and the second power switch form a buck circuit, to serve as the current limiting circuit.

23. A driving method, applied to a driving circuit, wherein the driving circuit comprises a bidirectional converter, a first power converter and an energy-storage capacitor, wherein an output port of the first power converter is coupled to a load and the energy-storage capacitor, and the bidirectional converter is coupled between the load and the energy-storage capacitor, and the driving method comprises:

supplying, by the first power converter, power to the load during a light load interval and a heavy load interval;

charging, by the first power converter, the energy-storage capacitor via the bidirectional converter during at least part of the light load interval; and supplying, by the energy-storage capacitor, power to the load via the bidirectional converter during the heavy load interval.

* * * * *